United States Patent
O'Neil et al.

(10) Patent No.: US 7,118,826 B2
(45) Date of Patent: Oct. 10, 2006

(54) ELECTRODE-ELECTROLYTE COMPOSITES HAVING DISCRETE REGIONS

(75) Inventors: James O'Neil, Corvallis, OR (US); Gregory S Herman, Albany, OR (US); Peter Mardilovich, Corvallis, OR (US); David Champion, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/423,110

(22) Filed: Apr. 24, 2003

(65) Prior Publication Data

US 2004/0214080 A1    Oct. 28, 2004

(51) Int. Cl.
*H01M 4/00*    (2006.01)

(52) U.S. Cl. .................... 429/128; 429/30; 429/12; 427/115

(58) Field of Classification Search ............... None
See application file for complete search history.

(56) References Cited

U.S. PATENT DOCUMENTS 5,633,097 A * 5/1997 Miller .................. 429/94

* cited by examiner

*Primary Examiner*—Patrick Joseph Ryan
*Assistant Examiner*—Julian Mercado

(57) ABSTRACT

Various embodiments of the invention are directed towards electrode-electrolyte composites. The electrode-electrolyte composites comprise electrode material and electrolyte material. At least a portion of the electrode material is present as a plurality of discrete regions having conductive contact with the electrolyte material.

16 Claims, 4 Drawing Sheets

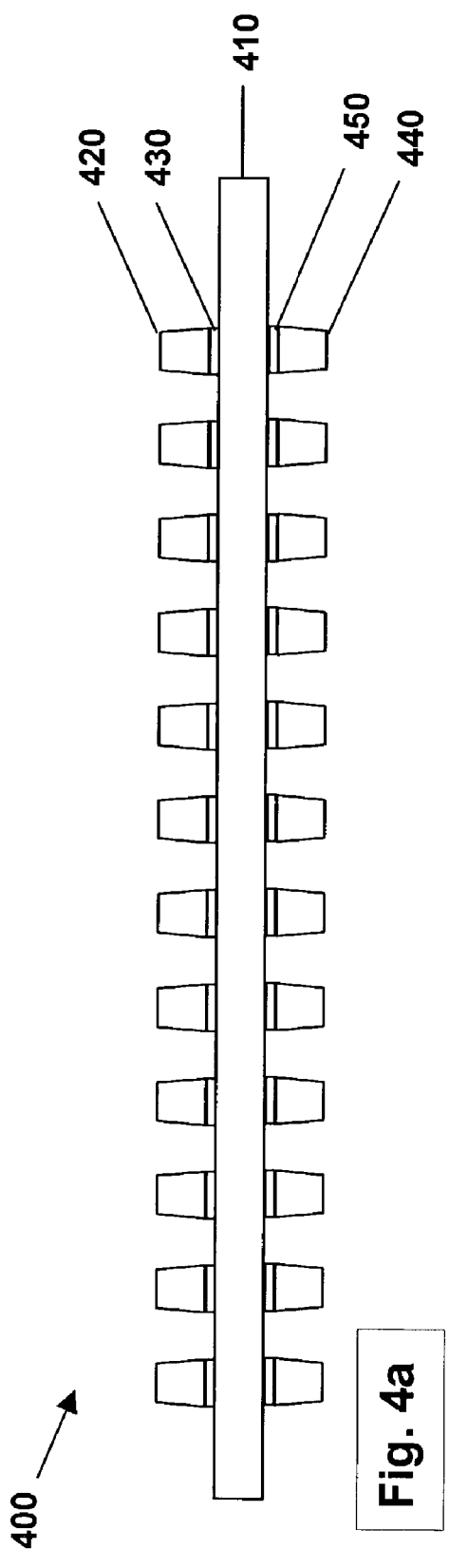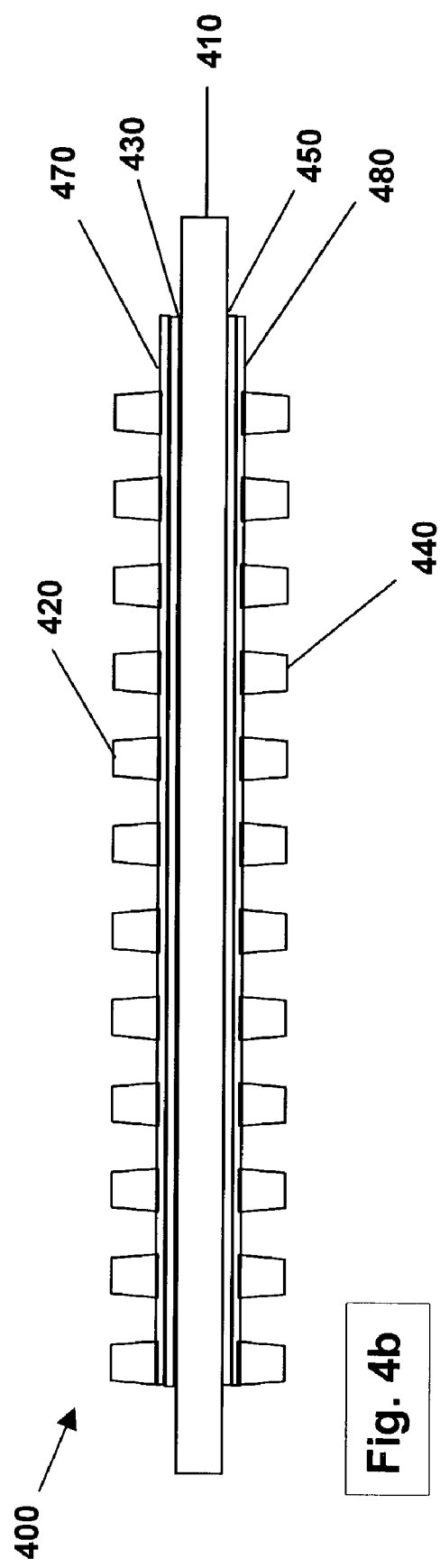

ELECTRODE-ELECTROLYTE COMPOSITES HAVING DISCRETE REGIONS

BACKGROUND

1. Field of the Invention

The present invention generally relates to electrode-electrolyte composites.

2. Background Information

Composite materials offer a wide range of advantages by incorporating materials having different characteristics into a single unit where each material retains its identity while contributing desirable properties to the whole. However, the compatibility of the different materials can cause problems depending upon the environmental conditions exposed to the composite (e.g., chemical reactivity, bonding, cracking, delamination and others).

This incompatibility behavior can be seen, for example, in certain types of fuel cell technology. Fuel cells generally use electrode-electrolyte layered composites comprising a unit cell. A unit cell may suffer from cracking and delamination of the electrode material due to differences in the thermal coefficients of expansion between the electrode and electrolyte materials, and changes in volume due to oxidation/reduction of the electrode materials. In addition, the problem is exacerbated by the fact that fuel cell performance levels may be related to the surface area of the electrode material. Thicker layers of electrode material may provide higher performance, but also may cause more severe cracking and delamination. The subject matter described below addresses this issue.

BRIEF SUMMARY

Disclosed herein are electrode-electrolyte composites and methods of making electrode-electrolyte composites. The electrode-electrolyte composites comprise electrode materials and electrolyte material. At least a portion of the electrode material is present as a plurality of discrete regions having conductive contact with the electrolyte material.

BRIEF DESCRIPTION OF THE DRAWINGS

For a detailed description of the embodiments of the invention, reference will now be made to the accompanying drawings in which:

FIGS. 3b and 3c show cross sectional views of the single chamber anode-electrolyte-cathode embodiment in FIG. 3a;

FIG. 4a shows cross sectional view of a dual chamber anode-electrolyte-cathode embodiment having an interfacial buffer layer that is distinct from the anode-electrolyte-cathode; and FIG. 4b shows a cross sectional view of a dual chamber anode-electrolyte-cathode embodiment having both an interfacial buffer layer and a thin continuous electrode layer.

NOTATION AND NOMENCLATURE

Figure 1A:
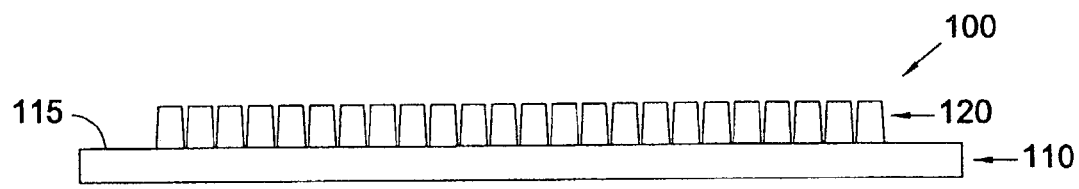
FIG. 1a shows a cross sectional view of a single chamber anode-electrolyte-cathode embodiment.

Certain terms are used throughout the following description and claims to refer to particular system components. As one skilled in the art will appreciate, companies may refer to components by different names. This document does not intend to distinguish between components that differ in name but have the same function.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention may include electrode-electrolyte composites. The composites may comprise at least one electrode material and at least one electrolyte material having different thermal coefficients of expansion. The electrode material is present as a plurality of discrete regions having conductive, i.e., ionic and/or thermal, contact with the electrolyte material.

It will be appreciated that the particular electrolyte material used in the embodiments of the invention is not critical to the spirit of the invention. The electrolyte material may be formed from any suitable material, as desired and/or necessitated by a particular end use. Suitable electrolyte materials may include, but are not limited to, yttria-stabilized zirconia (YSZ), samarium doped-ceria (SDC, $Ce_xSm_yO_{2-\delta}$), gadolinium doped-ceria (GDC, $Ce_xGd_yO_{2-\delta}$), $La_aSr_bGa_cMg_dO_{3-\delta}$ and mixtures thereof.

Likewise, the electrode material used in the embodiments of the invention is not critical to the spirit of the invention. The electrode material may be formed from any suitable material, as desired and/or necessitated by a particular end use. In general, the electrode materials may be comprised of metal(s), ceramic(s) and/or cermet(s). It will be appreciated that the electrode materials may comprise either anode or cathode materials. Examples of suitable anode materials include, but are not limited to, Ni-YSZ, Cu-YSZ, Ni-SDC, Ni-GDC, Cu-SDC, Cu-GDC and mixtures thereof. Examples of suitable cathode materials include, but are not limited to, samarium strontium cobalt oxide (SSCO, $Sm_xSr_yCoO_{3-\delta}$), barium lanthanum cobalt oxide (BLCO, $Ba_xLa_yCoO_{3-\delta}$), gadolinium strontium cobalt oxide (GSCO, $Gd_xSr_yCoO_{3-\delta}$).

The subject matter described herein, may have application in any type of electrode-electrolyte composite materials in which the materials have different thermal coefficients of expansion. In at least one embodiment of the invention, the electrode-electrolyte composite may comprise a fuel cell component. For the sake of clarity and illustration an embodiment of the invention will be discussed with respect to a particular application, i.e., fuel cells or solid oxide fuel cells. However, it should be appreciated that references to this particular application are meant solely for purposes of illustration, and should not be used to limit the disclosure, including the claims in any way, unless otherwise indicated. A fuel cell is an energy device that generates electricity and heat by electrochemically combining a gaseous fuel and an oxidizing gas. In order to do this a fuel cell will generally include, among other components, anode, cathode and electrolyte materials.

Figure 1B:
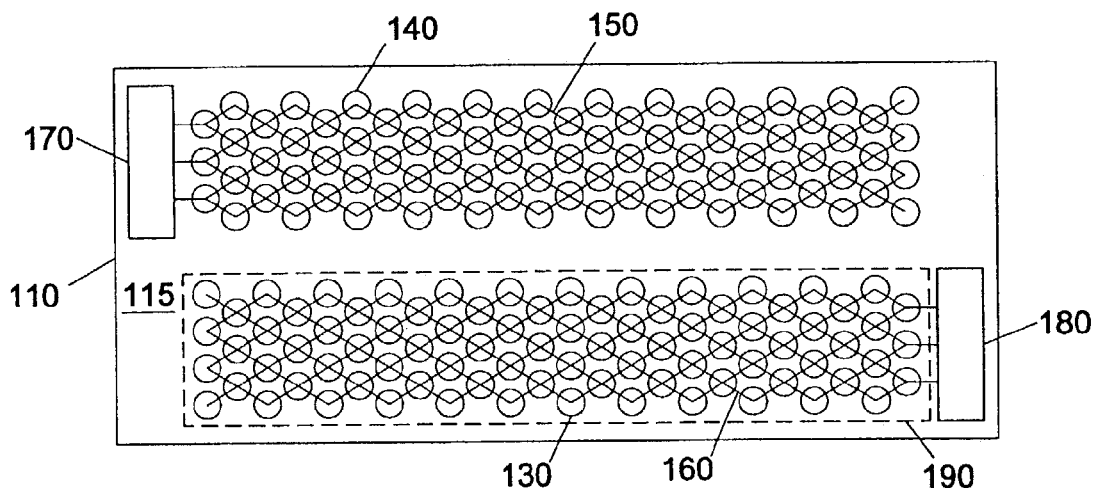
FIG. 1b shows a top view of a single chamber anode-electrolyte-cathode embodiment.

Referring now to FIGS. 1a and 1b, a fuel cell component 100 having a single chamber design is shown having a solid electrolyte layer 110 and an electrode layer 120. The electrolyte layer 110 has a substantially flat surface side 115. Anode material 130 and cathode material 140 are deposited on the same surface side 115 of the electrolyte material 110. As shown, both of the anode 130 and cathode 140 materials are present as discrete regions of material. It should be appreciated that, although the discrete regions are illustrated as circular patterns of material, the shape of the discrete regions is not critical to the invention and any suitable shape is acceptable.

Further, the discrete regions are shown in FIG. 1b as "islands," i.e., having no contact with other discrete regions of electrode materials, however, it is within the scope of this disclosure that the discrete regions may have some contact with other discrete regions of electrode material. Thus, it is intended that the term "discrete" includes the broad meaning that at least a portion of the deposited material has no contact with other materials. Accordingly, in one embodiment of the invention, the individual discrete regions on average may occupy an area of about 10 to about 99% of the single surface side of the electrolyte material. In another embodiment of the invention, the individual discrete regions on average may occupy an area of about 75 to about 90% of the single surface side of the electrolyte material.

The term "deposited" is used herein to generically describe the placement of electrode material in conductive contact with electrolyte material. Thus, for the embodiments described herein the term "deposited on" or variations thereof does not and should not be interpreted to mean "deposited directly on." Instead, the embodiments herein contemplate that materials may have interfacial layers or materials and still be "deposited on" a specified material. The method of depositing the electrode material is not critical to the embodiments of the invention and can be any suitable technique of patterning and/or deposition. One of ordinary skill in the art will understand that there are numerous suitable techniques, including but not limited to, physical and/or chemical deposition processes (e.g., atomic layer deposition (ALD), physical vapor deposition (PVD), chemical vapor deposition (CVD), electrochemical vapor deposition (EVD) and the like).

Patterning may be accomplished with photolithography or shadow masking. Deposition and patterning may be accomplished in the same step when using shadow masking. Shadow masking involves placing a thin metal (or other suitable material) template of holes, in direct contact to the electrolyte, then depositing a layer of electrode material over the template and the exposed substrate. After deposition, the shadow mask may be removed, leaving a pattern on the substrate. The resolution of state-of-the-art shadow masking may create discrete regions of deposited material as fine as approximately 10 µm, although no particular resolution is needed. The needed resolution may depend on the specific materials making up the composite, the thickness and porosity of the materials, the range of temperatures the composite is exposed to, and changes in volume due to oxidation/reduction.

State-of-the-art photolithography can make discrete regions as small as 90 nm in diameter. Photolithography involves: (1) depositing electrode over the entire electrolyte substrate, (2) coating the electrode with photo-imageable polymer (photoresist), (3) exposing the non-island area to an appropriate wavelength of light using a photomask or reticle, (4) removing the light-exposed non-island photoresist in a developer solution leaving a pattern of photoresist islands on top of the electrode material, (5) etching away all of the non-island material using wet etching, dry etching, sputter etching, or a combination of the latter two, and finally (6) removing the photoresist from the tops of the islands using $O_2$-ashing or sulfuric acid/hydrogen peroxide.

Another patterning technique using photolithography is generally termed "lift-off." Lift-off involves: (1) coating the electrode with photo-imageable polymer (photoresist), (2) exposing the island areas to an appropriate wave-length of light using a photomask or reticle, (3) removing the light-exposed photoresist in a developer solution leaving a pattern of island voids in the photoresist, (4) depositing electrode over the photoresist, (5) removing the non-island metal by removing the photoresist from under it using $O_2$-ashing or sulfuric acid/hydrogen peroxide.

Referring back to FIG. 1b, the discrete regions of anode material 130 and cathode material 140 may be located within a particular area, such as rectangular area 190 on the electrolyte surface. The discrete regions may be "grouped" according to electrode type. Although only one anode area and one cathode area are shown, it is contemplated that more than one anode and/or cathode area may be included in various patterns and arrangements. For example, the anode and cathode areas may be in various arrangements of alternating patterns, e.g., alternating rectangular patterns, other regular or irregular areas, or rows of discrete regions. Regardless, the arrangements are not critical to the scope of the invention.

Also shown in FIG. 1b are current collectors 150 and 160 connecting all of the anode 130 and cathode 140 materials, respectively. The current collectors 150 and 160 may comprise electrically conductive material embedded in the electrolyte material or other interfacial layers. In FIG. 1b, current collectors 150 and 160 are represented as embedded wires or thin lines of conductive material. The current collectors 150 and 160 may make terminal contact with bond pads 170 and 180, respectively. The bond pads 170 and 180 allow for electrical contact with external circuitry (not shown). One of ordinary skill in the art will appreciate that the type of current collector used to connect the electrode materials is also not critical to the scope of the invention. Any suitable technique or design that is compatible with the arrangement of the electrode and electrolyte materials will suffice.

It should be appreciated that the disclosure herein is not limited to particular architecture and design shown in the Figures. Fuel cells can be produced in a myriad of configurations. One aspect of configuration involves how the electrodes, electrolyte, and electrically conductive collectors of the fuel cell are deployed to expose the electrode material to the fuel and oxidizer. For example, the electrode and electrolyte materials may be arranged in a single chamber or dual chamber design.

In a single chamber design, the fuel and oxidizer can be mixed beforehand and presented to both the anode and cathode at once. This is possible because the anode and cathode materials contact the electrolyte material in close proximity to one another. For example, the electrode materials may be deposited in side by side regions on the same surface side of a piece of electrolyte material. The electrode materials may also be deposited on opposite sides of the electrolyte (as in FIGS. 2a and 2b) and still be considered a single chamber fuel cell, as long as the top and bottom surfaces of the composite are not isolated from each other, allowing the fuel-air mixture to flow freely between them.

In a dual chamber design, fuel is presented only to the anode, and oxidizer is presented only to the cathode. This is possible because the anode and cathode materials contact the electrolyte material at areas that can be physically separated in a formed cell. For example, the anode/electrolyte/cathode material can be formed in a sandwich configuration where the anode and cathode materials are separated by the electrolyte material.

Figure 2A:
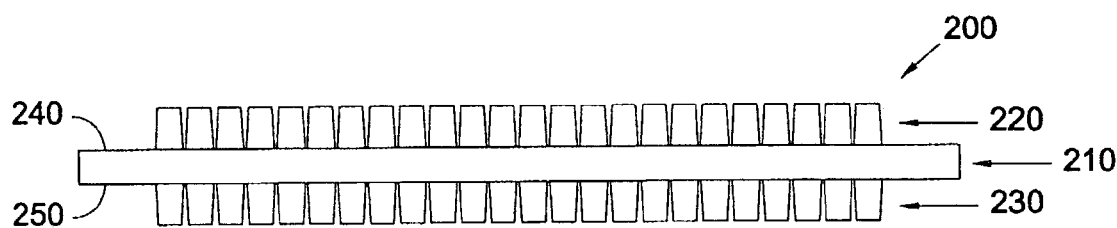
FIG. 2a shows a cross sectional view of a dual chamber anode-electrolyte-cathode embodiment.

FIG. 2a shows a fuel cell component 200 having a dual chamber design containing an electrolyte layer 210, anode layer 220 and cathode layer 230. The electrolyte layer 210 has two substantially flat surface sides 240 and 250. The electrolyte material in the dual chamber design separates the anode material 220 and cathode material 230. As shown, both of the anode 220 and cathode 230 materials are present as discrete regions of material. The arrangement of the discrete regions of anode 220 or cathode 230 material are not critical to the invention and may be as described with respect to FIG. 1b. Other relevant features, (e.g., current collectors, bond pads, etc.), of the dual chamber design may be identical to the single chamber design.

Figure 2B:
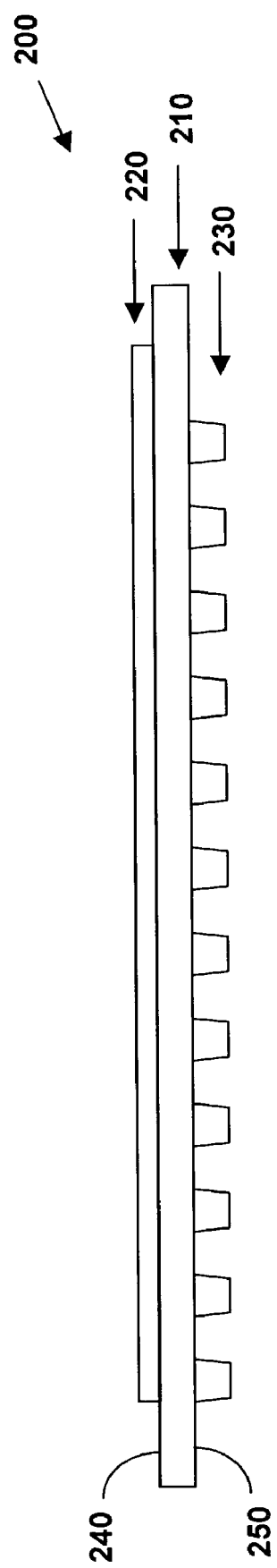
FIG. 2b shows a cross sectional view of a dual chamber anode-electrolyte-cathode embodiment.

Alternatively, combinations of discrete regions and continuous films or layers of electrode material may be used. FIG. 2b shows one embodiment having the same dual chamber design as described in FIG. 2a with the exception that the anode material 220 is a continuous film deposited on electrolyte 210. One of ordinary skill in the art will understand that for certain applications one of the electrode materials may have a thermal coefficient of expansion that is reasonably compatible with the electrolyte material while the other is too great of a mismatch. For example, in solid oxide fuel cells, the cathode material typically has a much greater mismatch with the electrolyte materials and the anode material is reasonably workable.

In any event, and regardless of the type of fuel cell, the electrode material must come into conductive contact with the electrolyte material. A fuel cell's primary reaction involves the transportation of oxygen ions through the electrolyte from the cathode material to the anode material. As fuel (hydrogen $H_2$ or a hydrocarbon) arrives at the anode, the fuel may react with oxygen ions from the electrolyte, forming, inter alia, water and releasing electrons ($e^-$) to an external circuit. Peak performance is achieved when the conductive contact area between the electrode material and electrolyte material is maximized.

In addition to being in contact with the electrolyte material and in accordance with the spirit of the invention, the electrode material may be deposited in a manner that reduces the amount of stress that the electrode material will experience during operation. In at least one embodiment of the invention, the electrode material may be deposited as a plurality of discrete regions of material. The discrete regions can be deposited at a thickness desired and/or as necessitated for a particular use. For example, in one embodiment involving fuel cell technology the regions may be relatively thick, e.g., 1.5 µm. Thus, the discrete regions will be more resistive to cracking relative to films of equal thickness, but are thick enough to provide the catalytic surface area required for a high performing device.

Figure 3A:
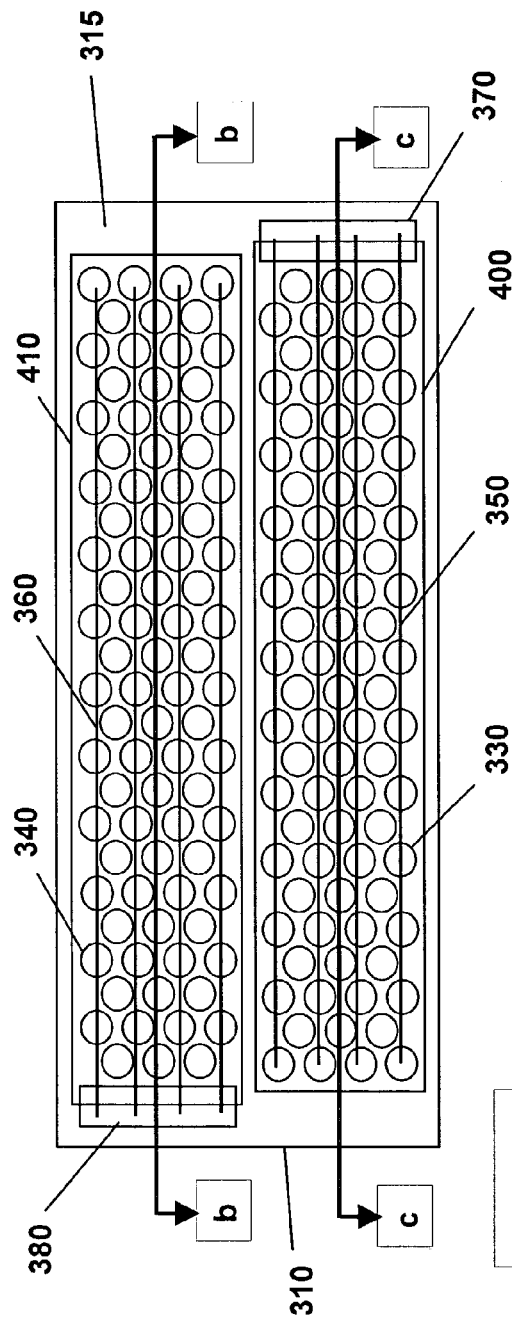
FIG. 3a shows a top view of a single chamber anode-electrolyte-cathode embodiment having a continuous layer of anode material connecting the anode islands and a continuous layer of cathode material connecting the cathode islands.
Figure 3B:
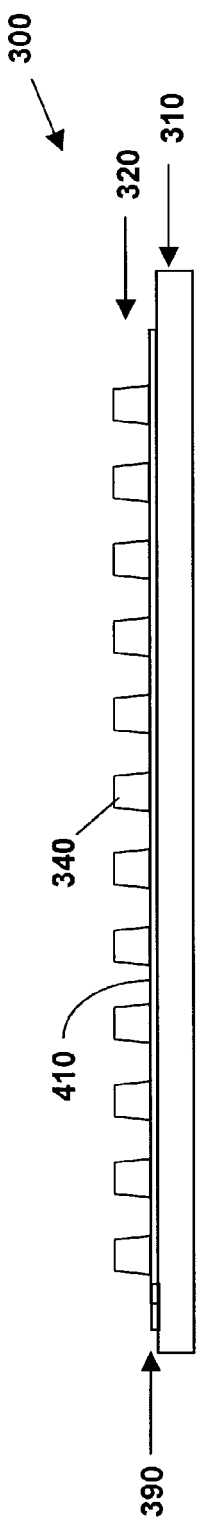
Figure 3C:
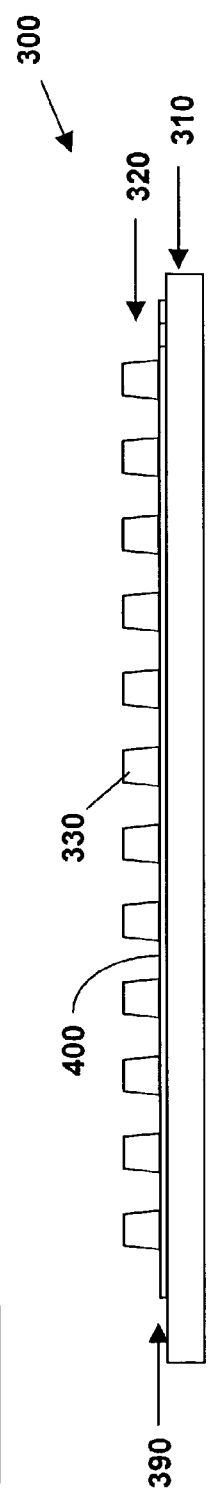

FIGS. 3a, 3b and 3c show a similar fuel cell component 300 having a dual chamber design having an electrolyte layer 310, discrete anode regions 330 and discrete cathode regions 340 with the addition of a continuous layer of thin anode material 400 connecting the anode islands and a continuous layer of thin cathode material 410 connecting the cathode islands. FIGS. 3b and 3c are two cross sections of fuel cell component 300 showing the electrolyte layer 310, the discrete region electrode layer 320 and the thin film electrode layer 390. The electrolyte layer 310 has a substantially flat surface side 315. FIG. 3a shows anode material 330 and cathode material 340 are deposited on the same surface side 315 of the electrolyte material 310. As shown, both of the anode 330 and cathode 340 materials are present as discrete regions of material.

The anode material 330 and cathode material 340 are deposited onto a thin continuous anode layer 400 and thin continuous cathode layer 410, respectively. Depending upon the materials used and operating conditions, thin layers of electrode material may be fairly resistive to cracking. The thickness of the continuous anode layer 400 and cathode layer 410 will likewise depend upon the materials being used and the operating conditions. In at least one embodiment, the thin continuous anode and/or cathode layers may be approximately equal to or less than 0.2 µm. The discrete regions of anode 330 and cathode 340 material may provide the additional surface area needed without increasing stress.

The need for current collectors when using thin continuous layers of electrode material may be reduced or eliminated. As shown, current collectors 350 and 360 connecting all of the anode 330 and cathode 340 materials, respectively, need only make contact with a portion of the thin continuous layers 400, 410 to achieve electrical contact with the entire mass of the electrode material. The current collectors 350 and 360 may comprise electrically conductive material embedded in the electrolyte material or other interfacial layers. The current collectors 350 and 360 may make terminal contact with bond pads 370 and 380, respectively. The bond pads 370 and 380 allow for electrical contact with external circuitry (not shown).

It should further be appreciated that being in conductive contact with the electrolyte material does not mean that the electrode materials have to be in direct physical contact. One of ordinary skill in the art will understand and appreciate that additional interfacial buffer layers may be used. Interfacial buffer layers have various functions and are not critical to the embodiments of the invention. Interfacial layers are within the scope of the invention provided that at least a portion of the electrode material maintains a conductive pathway with the electrolyte material.

Accordingly, FIG. 4a shows one embodiment of a fuel cell component 400 having a dual chamber design having an electrolyte layer 410, an anode layer 420, and a cathode layer 440 and interfacial layers 430 and 450. As shown, both of the anode 420 and cathode 440 materials are present as discrete regions of material. It will be appreciated that using the interfacial layers is equally applicable to the single chamber designs as described herein. FIG. 4b shows a similar embodiment as that of FIG. 4a, with added thin electrode layers 470 (anode) and 480 (cathode). The discrete anode regions 420 sit on a thin film of anode material 470, which sits on the anode interfacial layer 430 deposited on the electrolyte 410. Likewise, the discrete cathode regions 440 sit on a thin film of cathode material 480, which sits on the cathode interfacial layer 450 deposited on the electrolyte 410.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electrode-electrolyte composite, comprising:
   anode material;
   cathode material and
   electrolyte material;
   wherein at least a portion of the anode or cathode material is present as a plurality of discrete regions having conductive contact with the electrolyte material on a single surface side of the electrolyte material,
   wherein the individual discrete regions of anode or cathode material do not make contact with other individual discrete regions of the same material; and
   wherein a layer of electrode material is present at least partially as an interfacial layer between the discrete regions of similar material and electrolyte material.

2. The composite of claim 1, further comprising current collectors in electrical contact with each of the individual discrete regions of a particular material.

3. A fuel cell comprising the composite of claim 1.

4. The composite of claim 1 wherein the individual discrete regions on average occupy an area of about 10 to about 99% of the single surface side of the electrolyte material.

5. The composite of claim 1 wherein the individual discrete regions on average occupy an area of about 75 to about 90% of the single surface side of the electrolyte material.

6. An electrochemical apparatus, comprising:
   a stack of two or more fuel cell components comprised of electrode and electrolyte material;
   wherein the electrode material is deposited in at least one or more areas on a single surface side of the electrolyte material as two or more discrete regions of at least one of anode or cathode material each having conductive contact with the electrolyte material and wherein each of the discrete regions within a deposit area make electrical contact with each other; and
   wherein a layer of electrode material is present at least partially as an interfacial layer between the discrete regions of similar material and electrolyte material.

7. The apparatus of claim 6 wherein the individual discrete regions on average occupy an area of about 10 to about 99% of the single surface side of the electrolyte material.

8. The apparatus of claim 6 wherein the individual discrete regions on average occupy an area of about 75 to about 90% of the single surface side of the electrolyte material.

9. A method for reducing stress in a fuel cell, comprising depositing electrode material an a single electrolyte material, wherein the electrode material is deposited in at least one or more areas on a single surface side of the electrolyte material as two or more discrete regions of at least one of anode or cathode material each having conductive contact with the electrolyte material and wherein each of the discrete regions within a deposited area of either anode or cathode material make electrical contact with each other; and depositing one or more interfacial layers of material between the discrete regions of electrode material and electrolyte material.

10. The method of claim 9 wherein at least one of the interfacial layers comprises electrode material of similar material to the discrete regions and electrolyte material.

11. The method of claim 9 wherein the interfacial layers comprise at least one layer comprised of electrode material of similar material to the discrete regions and electrolyte material and at least one other layer of differing composition.

12. The method of claim 9 wherein the individual discrete regions of anode or cathode material do not make contact with other individual discrete regions of the same material.

13. The method of claim 9 further comprising current collectors.

14. The method of claim 9 wherein the current collectors make electrical contact with each of the individual discrete regions of a particular material.

15. The method of claim 9 wherein the individual discrete regions on average occupy an area of about 10 to about 99% of the single surface side of the electrolyte material.

16. The method of claim 9 wherein the individual discrete regions on average occupy an area of about 75 to about 90% of the single surface side of the electrolyte material.

* * * * *

UNITED STATES PATENT AND TRADEMARK OFFICE
CERTIFICATE OF CORRECTION

PATENT NO. : 7,118,826 B2  Page 1 of 1
APPLICATION NO. : 10/423110
DATED : October 10, 2006
INVENTOR(S) : James O'Neil et al.

It is certified that error appears in the above-identified patent and that said Letters Patent is hereby corrected as shown below:

In column 8, line 8, in Claim 9, after "material" delete "an" and insert -- on --, therefor.

Signed and Sealed this

Tenth Day of November, 2009

David J. Kappos
*Director of the United States Patent and Trademark Office*